UNITED STATES PATENT OFFICE.

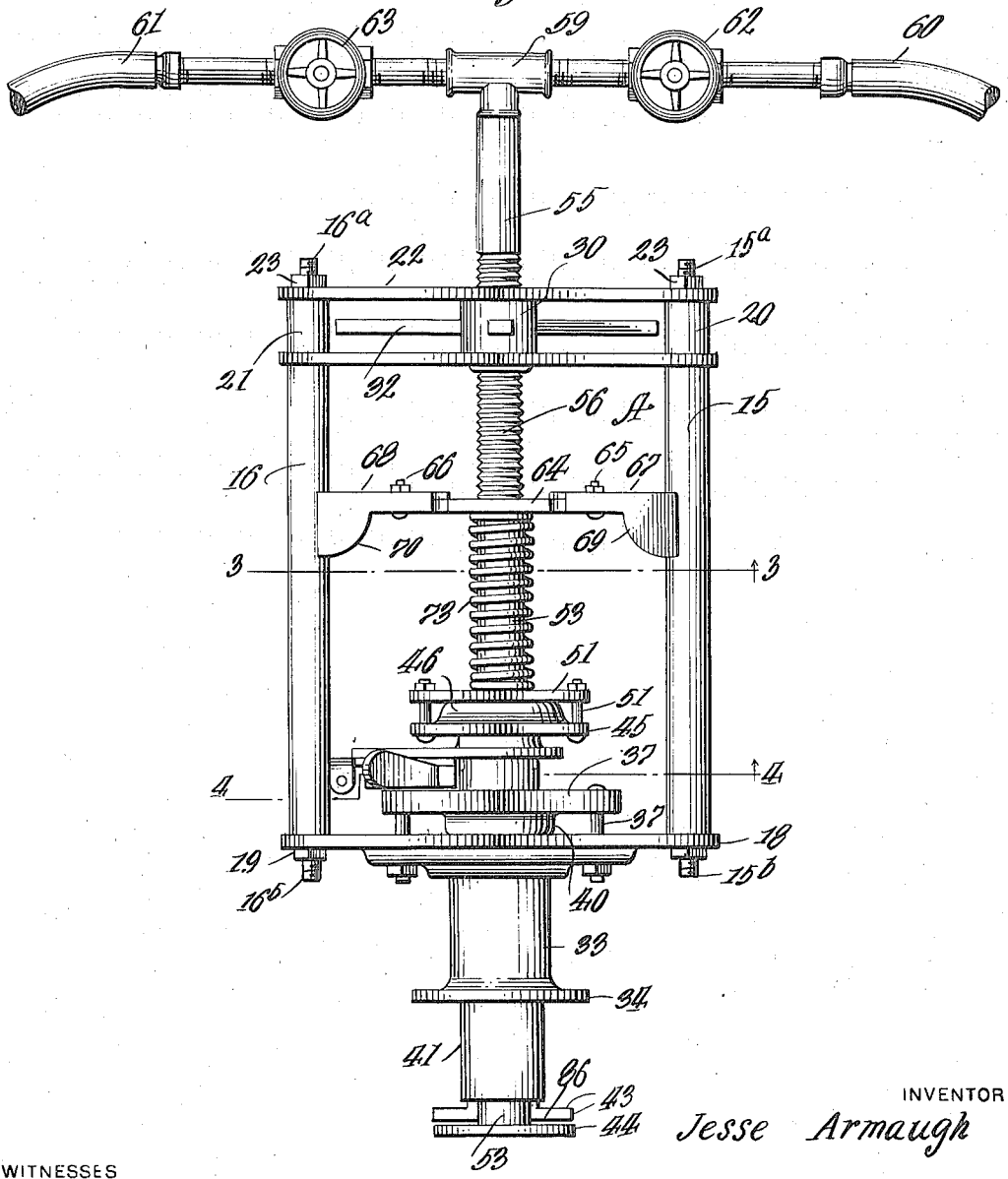

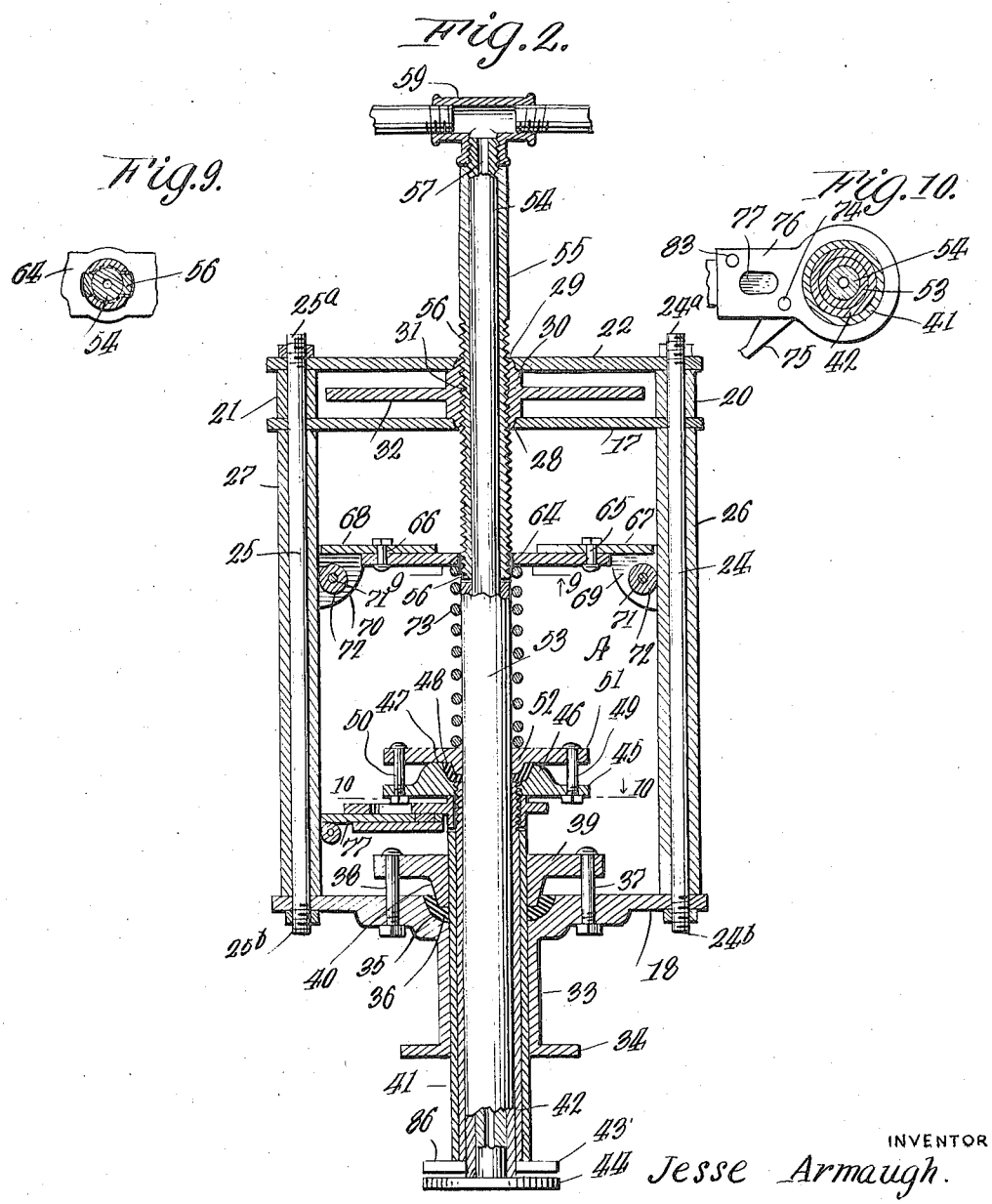

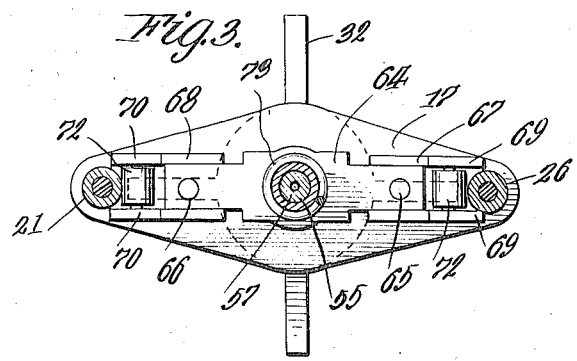
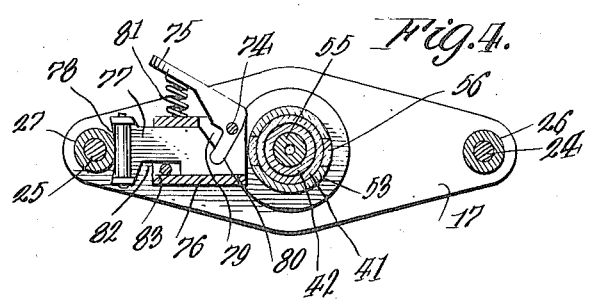
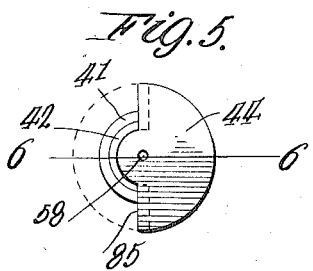
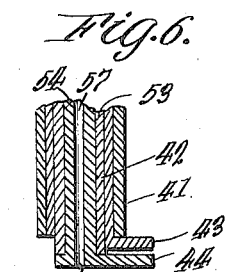
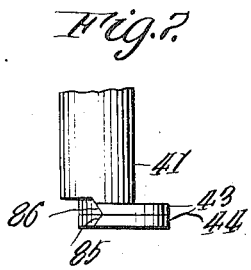
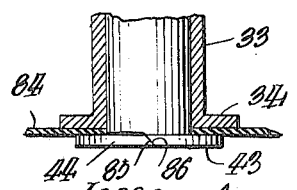

JESSE ARMAUGH, OF CHICAGO, ILLINOIS.

HIDE-REMOVER.

1,263,636.                    Specification of Letters Patent.       Patented Apr. 23, 1918.

Application filed October 17, 1917. Serial No. 197,123.

*To all whom it may concern:*

Be it known that I, JESSE ARMAUGH, a citizen of the United States, residing at Chicago, in the county of Cook and State of Illinois, have invented certain new and useful Improvements in Hide-Removers, of which the following is a specification.

This invention is a method and apparatus for the quick removal of hides from animals through the employment of a fluid or liquid under pressure.

One object of the invention is to provide a method whereby the hide of an animal may be quickly separated from the carcass by injecting air between the superficial fascia and the hide.

Another object is to provide an apparatus that may have rotatable semi-circular blades, which blades are thereafter employed as flanges to coöperate with a solid flange in forming a substantially air tight joint, at which time the hide is used as a gasket.

A further object is to provide an apparatus which after having been secured in operative position relative to the hide and carcass, will permit of a controlled introduction of fluid or liquid under pressure to cause a quick and prompt separation of the hide from the carcass.

A still further object is to provide a method and apparatus which will materially lessen the time required for "skinning," avoid the injury and damage to the hide as when employing a knife, thus maintaining the hide at its full market value.

Broadly stated the method generally consists of the controlled introduction of a fluid or liquid under pressure beneath the hide of an animal as to cause a quick and efficient separation of the hide from the carcass, and the apparatus generally comprises a frame carrying rotatable semi-circular blades, that are longitudinally movable with respect to said frame, said blades being adapted to serve as a flange to coöperate with a flange carried by said frame, means to move and rotate said blades, means to connect a source of supply of fluid or liquid under pressure with said apparatus so that the fluid or liquid may be discharged adjacent a flange and beneath the hide, and a spring to coöperate with the frame.

One practical form of apparatus and the method employed for removing hides from animals will be described and illustrated in the accompanying drawings, in which:—

Figure 1 is a side elevation of the assembled apparatus and showing the fluid or liquid supply connections, Fig. 2, is a vertical sectional view of the apparatus, Fig. 3, is a horizontal sectional view taken on the line 3—3 of Fig. 1, Fig. 4, is a horizontal view taken on the line 4—4 of Fig. 1, Fig. 5, is an end view of one of the semi-circular blades, Fig. 6, is a sectional view taken on the line 6—6 of Fig. 5, Fig. 7, is a detailed side elevation of the two semi-circular blades in their alined position, Fig. 8, is a detailed sectional view showing the semi-circular blades in their position to form a flange with a portion of the hide engaged between them and the solid flange, Fig. 9 is a sectional view taken on the line 9—9 of Fig. 2, and Fig. 10, is a sectional view taken on the line 10—10 of Fig. 2.

In the preferred type of apparatus employed to carry out the method that will be described a frame A is employed. The frame consists of two standards 15 and 16 that are provided with reduced and threaded ends. The threaded ends corresponding to the standard 15 are respectively 15$^a$ and 15$^b$ and the ends for the standard 16 are 16$^a$ and 16$^b$. The standards are preferably made so that they provide shouders adjacent their threaded ends.

To coöperate with the shoulders the cross pieces or yokes 17 and 18 are employed and these cross pieces are provided with suitable holes through which may pass the threaded ends of the standards. To hold the cross piece or yoke 18 in its proper position against the shouldered portions of the standards 15 and 16 the nuts 19 may be employed. The cross piece or yoke 17 is adapted to pass over the threaded portions 15$^a$ and 16$^a$ after which there is placed a sleeve 20 upon the threaded end 15$^a$, and a sleeve 21 is placed upon the threaded end 16$^a$.

After the sleeves 20 and 21 have been placed in position another cross piece or yoke 22 is engaged with the threaded ends 15ª and 16ª. To hold the cross pieces 17 and 22 and the sleeves 20 and 21 in firm engagement with the shouldered portions of the standards 15 and 16 the nuts 23 are employed. The sleeves 20 and 21 serve as spacing elements to maintain the cross pieces 17 and 22 in their proper position.

It is preferred to hold the several cross pieces 17, 18, and 22 by means of rods 24 and 25 that may have the threaded ends 24ª and 24ᵇ, 25ª and 25ᵇ. The rod of this type is shown more particularly in Fig. 2, and between the cross pieces or yokes 17 and 18 the rod 24 is surrounded by a sleeve 26, and the rod 25 is surrounded by a sleeve 27. This rod may also have surrounding it the sleeves 20 and 21 as shown in Figs. 1 and 2. The sleeves 20 and 21, and 26 and 27 as shown in Fig. 2 will serve as spacing elements to maintain the cross pieces or yokes 17, 18, and 22 in their proper spaced relation and thus form a frame generally indicated at A.

The cross piece or yoke 17 is provided centrally with a hole 28 and the cross piece or yoke 22 is also provided with a hole 29 forming a seat. These holes 28 and 29 are preferably in alinement so that they may coöperate with the hub 30 of a hand wheel. The hub 30 is preferably so formed that it will conform to the shape of the seats in the holes 28 and 29 which may then serve as bearings.

The hub 30 is provided with a through passage that is internally threaded, the threads being indicated at 31. Extending radially from the hub 30 are suitable arms forming handles as indicated at 32. There are preferably four, though only three may be seen in Fig. 1.

The cross piece or yoke 18 is provided centrally with a tubular portion 33 having at its lower end a flange 34. As shown more particularly in Fig. 2 the cross piece is provided centrally with a through passage that extends through the tubular portion 33. Adjacent the upper end of the passage, the upper surface of the cross piece 18 is provided with a concentric recess 35 that serves to hold suitable packing material 36 therein.

At suitable spaced points the cross piece 18 is provided with holes through which pass the bolts 37 and 38. These bolts are provided with heads and threaded ends which have nuts thereon. These bolts 37 and 38 coöperate with a flange 39 that is provided with an annular boss 40. This flange 39 is also provided with a hole to aline with the passage formed in the cross piece 18 and its tubular portion 33. The bolts 37 and 38 are adapted to force the flange 39 downward so as to embed the boss 40 in the packing material 36.

Disposed to move within the through passage formed in the yoke 18 and the tubular portion 33 is a sleeve 41. The sleeve 41 also extends through the flange 39 and rides in contact with the packing 36 to form an air tight joint. Disposed within the sleeve 41 is another sleeve 42 that is provided at its lower end with a semi-circular blade 43. The diametrical edge of this blade 43 is angularly formed so that when coöperatively engaged with the semi-circular blade 44 the two blades will form a single flange to coöperate with the flange 34.

The upper end of the sleeve 42 is preferably threaded to engage with the flange 45. The flange 45 is provided with an annular boss 46 that has formed therein a recess 47 which is concentric with a central opening. Disposed in the recess 47 is suitable packing which lies adjacent the threaded end of the sleeve 42. The flange 45 is provided with spaced holes to coöperate with the bolts 49 and 50. These bolts also engage with suitable holes in the flange 51 which has formed thereon a boss 52 to engage with the packing 48. The flange 51 is also provided with a central opening that is in alinement with the inner diameter of the sleeve 42. The bolts 49 and 50 serve to draw the flanges 45 and 51 together in a manner that tends to compress the packing and form an air tight joint.

Within the sleeve 42 there is disposed a sleeve 53 that projects a certain distance beyond the flange 51. This sleeve 53 surrounds the tube 54 which carries at its lower end the semi-circular blade 44. The lower end of this sleeve 53 abuts and rests on this blade.

An adjusting screw 55 is provided with the threads 56 to coöperate with the threads 31 formed in the hub 30. The upper end of the screw 55 may be left blank and smooth. The threads 56 are continued on the screw 55 so that the lower end of the screw passes between the guide member disposed between the cross pieces 17 and 18. The lower end of the screw 55 is formed with diametrically placed lugs 56 to coöperate with the recess formed in the adjacent and abutting end of the sleeve 53.

The tube 54 is provided with a bore or through passage 57 having exit port 58 at its lower end adjacent the semi-circular blade 44. The upper end of this tube may be provided with pipe threads so that a T coupling 59 may be connected therewith. This coupling may be connected with piping 60 and 61 that extend from each side of said coupling. This pipe may be connected with a suitable source of fluid or liquid under pressure and to control the flow thereof into the bore 57, the valves 62 and 63 may be employed.

The several elements recited require suitable guiding means which have been mentioned before, and these means consist of a central plate 64 that is provided centrally with an aperture through which may pass the screw 54. The upper ends of this plate 64 are provided with suitable holes to coöperate with the bolts 65 and 66 that serve to hold the extension plates 67 and 68. The upper ends of the plates 67 and 68 are provided with depending flanges 69 and 70.

These flanges extend downward from both sides of the plate and as shown more particularly in Fig. 2 they are provided transversely with holes. To coöperate with these holes there is a shaft 71 which carries a guide wheel 72. This construction is common to both the plates 67 and 68 and the flanges 69 and 70. As shown the flanges 69 and 70 project slightly beyond their respective plates 67 and 68. This will form a U-shaped end so that the wheels 72 may contact with the sleeves 26 and 27 as shown in Figs. 2 and 3.

The plates 67 and 68 may be formed with suitable guide flanges to coöperate with reduced ends of the plate 64 if so desired. This construction is more clearly shown in Fig. 3. Interposed between the plate 64 and the flange 51 there is a coiled spring 73 which as shown surrounds the sleeve 53. If desired the plate 64 may be secured to the screw 55 in such a manner that the energy of the spring will be extended and expanded against said plate and flange.

Disposed upon the sleeve 42 and below the flange 45 there is a suitable latching device which serves to turn or rotate one of the semi-circular blades 43. This latching device consists of an L-shaped lever pivotally mounted at 74, said lever being provided with a handle 75. The lever is pivotally mounted in a suitable housing 76. This housing is adapted to accommodate a movable arm 77 carrying at its outer end the roller 78. The roller is adapted to move over the sleeve 27 as shown more particularly in Fig. 4. The arm 77 may be provided at the opposite end with a recess 79 to coöperate with the short end 80 of the L-shaped lever.

To maintain the handle in its normal position a spring 81 is employed which is adapted to bear against said handle and the housing 76. To limit the movement of the arm 77 it is provided with a recess 82 which forms a notch to coöperatively engage with a pin 83 serving as a stop member.

In practical use when it is desired to remove the hide from a carcass the apparatus above described may be employed. It is first necessary to make a small incision and to remove a small part of the hide so that the semi-circular blades may be inserted. At the time of insertion the two blades are positioned upon the same side so that their bodies lie adjacent. The blades are preferably run out from the stationary flange 34 about an inch and one-half. They are run out by turning the handles 32 which rotates the hub 30 and causes the screw 55 to move.

The rotation of the hub 30 causes a relative movement of the screw 55 to the frame A. After the blades have been inserted through the incision the blade 43 is given a half turn. The blades 43 and 44 are now in position to form a flange to hold the hide 84 against the flange 34. The manner of holding is more clearly shown in Fig. 8.

In order to bring the blades 43 and 44 into coöperative engagement the handles 32 are moved which cause a relative movement between the frame and screw 55. This tends to draw the blades 43 and 44 toward the flange 34. In doing so the angular edges of the blades 43 and 44 as indicated at 85 and 86 permit them to lie in a plane that is parallel and common to both.

When the hide 84 has been firmly clamped between the flanges, one or the other of the valves 62 or 63 may be operated which permits a fluid or liquid under pressure to enter the bore 57 of the tube 54. The valves 62 and 63 control the amount or volume of such fluid or liquid passing and escaping by means of the exit port 58.

After a certain length of time a sufficient amount of fluid or liquid will pass between the hide proper and the fascia which will produce a separation of the hide over the entire carcass. The hide may be removed from the carcass with very little injury such as would be caused by employing a knife. Those parts of the hide which include the limbs below the knees are usually wasted but by this method those parts may be recovered with the complete hide.

I claim:

1. An apparatus for removing hides from animal carcasses, which comprises a frame, a fluid carrier including an outlet carried by the frame, and flanges coöperative with each other and the hide to position and maintain said outlet in operative position beneath the hide.

2. An apparatus for removing hides from animal carcasses, which comprises a frame, members movable relative thereto and carried thereby, some of said members having a fluid passage with inlet and outlet ports, a controlled source of fluid supply connected thereto, and means operable by and from said frame to connect the outlet beneath the hide.

3. An apparatus for removing hides from animal carcasses, which comprises a frame having side members, yokes, spaced from each other and secured to the frame, a plurality of telescopic members longitudinally disposed with respect to the frame and through said yokes, one of said members being provided with a through passage for fluids and liquids, a flange secured to one of the yokes, a split flange whose parts are carried by certain of the telescopic members, means to rotate and move longitudinally said members to aline the parts of the split flange so that a hide may be engaged and be removably retained between said flanges, and a controlled source of fluid supply connected to the end of the member having the through passage.

4. An apparatus for removing hides from animal carcasses, which comprises a frame having movable members adapted to be removably engaged with the hide, and fluid carrying means under manual control for permitting the introduction of fluids and liquids between the hide and carcass, one of said members being movable longitudinally, relative to the other member for utilizing the hide as a gasket by clamping the hide between said members.

5. An apparatus for removing hides from animal carcasses, which comprises a frame having side members and spaced yokes, tubular members connected with and passing through said yokes one of which members serves as a fluid and liquid conveyer, means for producing a longitudinal movement of certain of said tubular members relative to the frame, a spring pressed movable guide member having its ends adapted for engagement with the side members of the frame, adjustably retained means adapted to rotate one of said members, a solid flange carried by one of the yokes, a split flange whose parts are separately carried by the tubular members, means to rotate one of the tubular members to bring the parts of the split flange into alinement and when the tubular members are moved longitudinally, said split flange then serving as a solid flange to coöperate with the solid flange for removably engaging with and retaining a hide, and means connected with one of the tubular members for injecting fluids and liquids adjacent the split flange and beneath the hide of an animal.

6. An apparatus for removing hides from animal carcasses, which comprises a frame including spaced yokes, fluid carrying means including a member movable longitudinally of the frame, and an outlet, a guiding means for said member, a coil spring on the member and coöperatively connected with the guiding means, a movable split flange for engaging with the flesh side of the hide of the animal, one part of said flange being rotatable, a solid flange adapted to engage with the hair side of the hide, said split flange being connected with the fluid carrying means, so that the outlet thereof is adjacent the split flange for positioning beneath the hide.

In testimony whereof I affix my signature in presence of two witnesses.

JESSE ARMAUGH.

Witnesses:
    CHARLES X JOHNSON,
    OLLIE WISE.